United States Patent
Lehmann

(10) Patent No.: US 6,651,195 B1
(45) Date of Patent: Nov. 18, 2003

(54) METHOD AND SYSTEM FOR BIT ERROR STRUCTURE MEASUREMENTS OF DATA TRANSMISSION CHANNELS

(75) Inventor: Erwin Lehmann, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/622,611

(22) PCT Filed: Nov. 18, 1999

(86) PCT No.: PCT/EP99/08865

§ 371 (c)(1),
(2), (4) Date: Aug. 17, 2000

(87) PCT Pub. No.: WO00/36784

PCT Pub. Date: Jun. 22, 2000

(30) Foreign Application Priority Data

Dec. 17, 1998 (DE) .......................................... 198 60 125

(51) Int. Cl.[7] .............................................. G06F 11/00

(52) U.S. Cl. ......................................................... 714/704

(58) Field of Search ................................. 714/704, 705, 714/707

(56) References Cited

U.S. PATENT DOCUMENTS

| | | | |
|---|---|---|---|
| 3,694,757 A | 9/1972 | Hanna, Jr. ................ | 340/7.43 |
| 3,824,548 A | 7/1974 | Pohl et al. ................ | 340/140 |
| 4,023,026 A | 5/1977 | O'Farrell ................... | 708/252 |
| 4,745,603 A | 5/1988 | Shedd ....................... | 714/739 |
| 4,964,165 A | 10/1990 | Journeau ................... | 380/261 |
| 5,727,018 A | 3/1998 | Wolf et al. ................ | 375/149 |
| 5,732,089 A | 3/1998 | Negi ......................... | 714/704 |
| 5,761,216 A | 6/1998 | Sotome et al. ............ | 714/738 |
| 5,959,479 A | 9/1999 | Woodward ................. | 327/160 |

FOREIGN PATENT DOCUMENTS

| | | |
|---|---|---|
| DE | 26 43 836 | 4/1978 |
| DE | 37 33 278 | 4/1989 |
| DE | 43 18 368 | 7/1994 |
| DE | 195 25 761 | 1/1996 |

(List continued on next page.)

OTHER PUBLICATIONS

Herzog, "Bitfehlerstruktur–Messgerät für den Betrieb," vol. 74, No. 11, Nov. 1997.

Primary Examiner—Albert Decady
Assistant Examiner—Esaw Abraham
(74) Attorney, Agent, or Firm—Kenyon & Kenyon

(57) ABSTRACT

Pseudo-random sequences (PRS) are used for measuring bit error structures in digital transmission paths, into which sequences labels in the form of test error sequences are inserted at a defined site in the pattern. Often it is not possible to mark the measured data at the sender's end, if, for example, the PRS measuring devices do not allow a label fade-in at the sender's end in end-to-end measurements in international data exchange. The invention provides a means for subsequently providing PRS labels. In a method for measuring bit error structures of a digital transmission channel of a digital transmission link, a marking of transmitted quasirandom sequences takes place at the receiving end. The marker is switched on at the receiver's end before a bit-by-bit comparator and the quasirandom sequence marking is synchronized with the quasirandom sequence signal received from the sender's end. The marking at the receiver's end is adapted to a known marking at the sender's end with respect to the site in the pattern, frequency and number of clock periods. The quasirandom sequence marking may be used to assign slips and systematically occurring bit errors in the transmission path to certain devices. To-the-bit determination of cell losses is ATM measurements is possible.

14 Claims, 4 Drawing Sheets

| | FOREIGN PATENT DOCUMENTS | | | JP | 1-231446 | 9/1989 |
|---|---|---|---|---|---|---|
| | | | | JP | 3-274836 | 12/1991 |
| DE | 197 15 829 | 10/1998 | | JP | 5-37495 | 12/1993 |
| DE | 197 51 258 | 1/1999 | | JP | 06 164556 | 6/1994 |
| EP | 0 524 235 | 8/1996 | | JP | 07 209382 | 8/1995 |
| EP | 0 456 974 | 5/1997 | | JP | 8-191288 | 7/1996 |
| JP | 58-196743 | 11/1983 | | JP | 9-46322 | 2/1997 |

METHOD AND SYSTEM FOR BIT ERROR STRUCTURE MEASUREMENTS OF DATA TRANSMISSION CHANNELS

FIELD OF THE INVENTION

The present invention relates generally to the measurement of digital transmission links and, in particular, to bit-error structure measurements of data transmission channels using quasirandom sequences as a measuring signal, with inserted marking in the form of bit inversions at defined sample points.

RELATED TECHNOLOGY

Data measuring devices are known which employ quasirandom sequences (QRSs) as measuring signals. Having been transmitted over an object under test (data transmission link), the transmitted QRSs are compared in the data measuring receiver to an identically generated QRS reference signal.

The result of this comparison is a binary signal sequence which indicates for each bit whether it was correctly or incorrectly transmitted. This bit error signal represents the bit error structure which can be recorded as a numerical sequence of the consecutive correctly or incorrectly transmitted bits (see Herzog, W.: Ein Bitfehlerstruktur-Meßgerätf ür den Betrieb. [A bit error structure measuring device for the operation.] telekom praxis, Vol. 74/1997, No. 11), which is hereby incorporated by reference herein.

Further known is the input at the transmission end of a marking at a fixed sample point of the QRS. The marking is composed of a test error series of systematic bit inversions which is inserted regularly, but not at each QRS cycle. The test error series includes a higher number of bits than the QRS-generating shift register has stages, so that it clearly differs from transmission errors caused by the transmission link.

Since, at the receiving end, the test error series appear as bit errors at a known sample point of the QRS, they can be used in the recorded bit error structure as a reference point for QRS sample calculations. This makes it possible to find systematic errors which point to device failures in the course of the transmission link under test. Improving quality by detecting and eliminating device failures is an objective of bit error structure measurement technology.

If the clock pulse interval of the test error series is monitored at the receiving end, said clock pulse interval having to correspond to a whole-number multiple of the QRS cycle length, then it is possible to calculate slips of the kind which occur when the character synchronism between test transmitter and test receiver is lost, e.g., as a result of cell losses in ATM (Asynchronous Transfer Mode) measurements.

In order to be able to use the advantages of this high-quality measuring method, the transmitting end must be provided with a suitable QRS test transmitter capable of transmitting test data with such a QRS marking. In fact, however, this is often not the case for measurements on transmission links if the transmitting end is merely provided with commercially available measuring devices which, although employing QRS signals, do not recognize a marking of the type described. However, the measuring devices are often used because of other measuring advantages.

Such measuring advantages may lie in the fact that more meaningful end-to-end measurements are possible instead of loop measurements, or that commercially available measuring devices supply the appropriate measuring interfaces at the transmitting end, and no new development is then necessary at the bit error structure measuring location.

Practical cases of different, usually commercially available, measuring devices at the transmitting end arise, firstly, in the event of large geographical separation between transmitter and receiver in worldwide data traffic (transmitter in California, receiver in Berlin) and, secondly, in the case of measurements between connection points with different interfaces (ATM transmission at the in-house rate of 25.6 Mbit/s for the transmitter and at the line-side STM1 rate, usual for ATM measurements, of 155.52 Mbit/s for the receiver).

Since a measuring device used at the transmitting end often does not allow optional input of external test data which could be provided with a QRS marking in a manner suitable for the process, it is necessary to make do with those QRS measurement data which are provided internally by the measuring device itself.

However, the bit error structure measuring location used at the receiving end will then not have the-test error series which is required later as a QRS mark in the evaluation of the bit error structure records.

SUMMARY OF THE INVENTION

An object of the present invention is to replace a QRS marking missing at the transmitting end by process engineering in such a way that an equivalent evaluation is possible for the bit error structure.

The present invention provides a method for bit error structure measurements of a data transmission channel of a data transmission link, the method including transmitting a quasirandom sequence from a transmitting end over the transmission link to a receiving end, the quasirandom sequence serving as a measuring signal, and marking the transmitted quasirandom sequence at the receiving end upstream of a bit-for-bit comparator so as to form bit inversions at defined sample points, the marking being synchronized with the transmitted quasirandom sequence at the receiving end.

The present invention also provides a system for bit error structure measurements of a data transmission channel of a data transmission link, the system including a transmitter for transmitting a quasirandom sequence from a transmitting end over the transmission link to a receiving end, the quasirandom sequence serving as a measuring signal, and a marker for marking the transmitted quasirandom sequence at the receiving end upstream of a bit-for-bit comparator so as to form bit inversions at defined sample points, the marking being synchronized with the transmitted quasirandom sequence at the receiving end.

According to the present invention a substitute marker is created at the receiving end of bit error structure measuring locations by additionally disposing a QRS symbol detector, a QRS starting pulse generator and a QRS marker, which is switchable from case to case, at the receiver input of the data measuring device before the bit-for-bit comparator.

BRIEF DESCRIPTION OF THE DRAWINGS

The present invention is elaborated upon below with reference to the drawings, in which.

DETAILED DESCRIPTION

Figure 1:
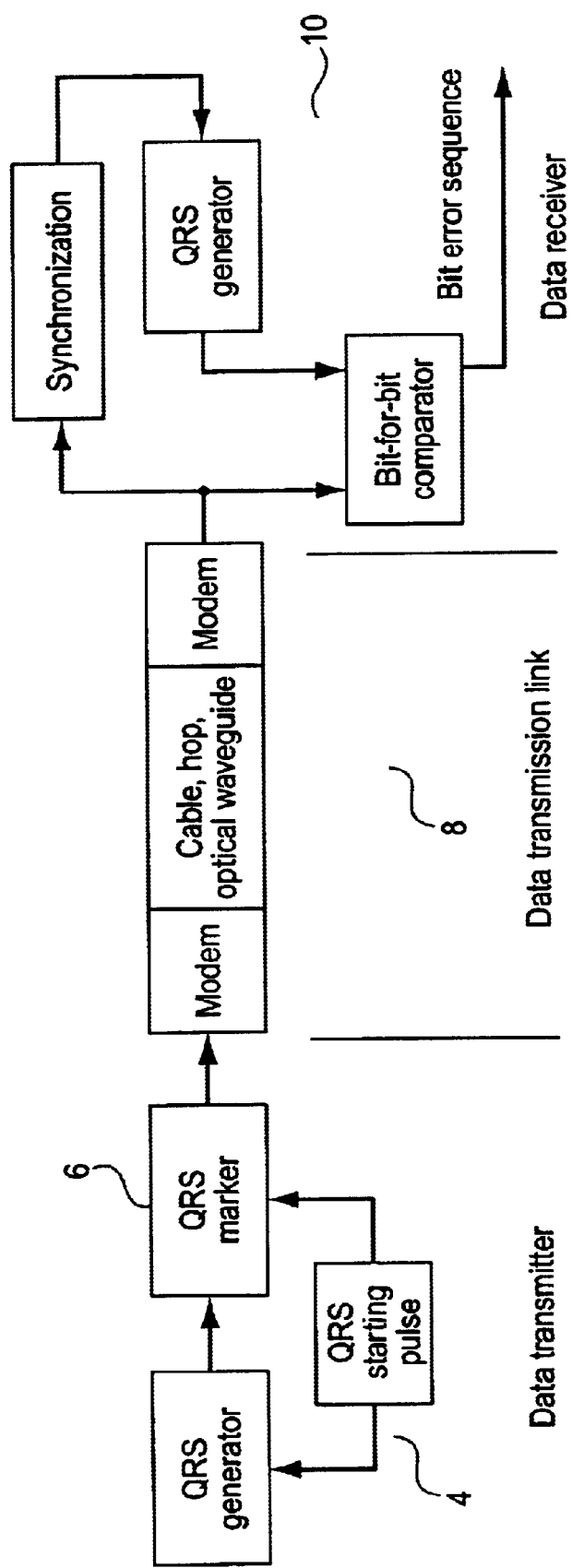
FIG. 1 shows a schematic block diagram of a prior art arrangement for bit-error structure measurements.
Figure 2:
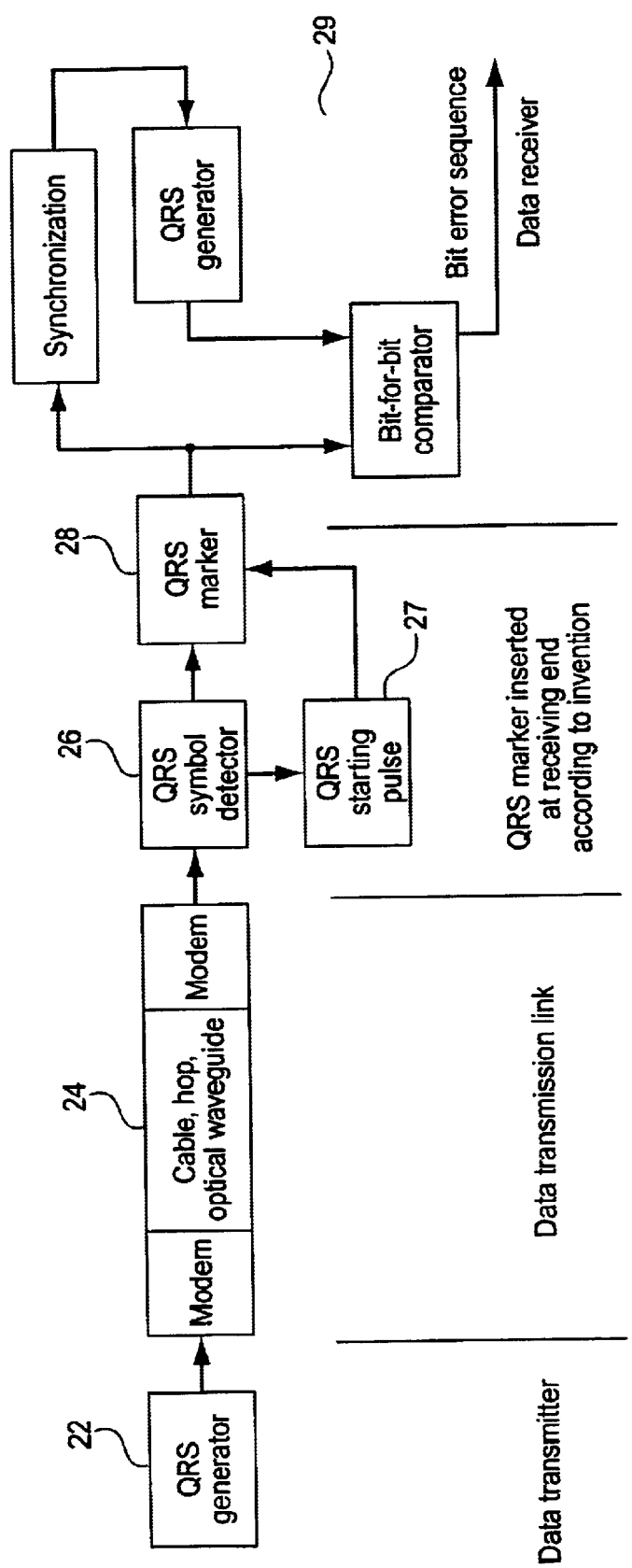
FIG. 2 shows a schematic block diagram of an arrangement for bit-error structure measurements according to an embodiment of the present invention.

Firstly, FIG. 1 shows a known measuring setup for bit error structure measurements in which the QRS data transmitter 4 is already provided with a QRS marker 6. The QRS data is transmitted over transmission link 8 to data receiver 10. FIG. 2 shows, as data transmitter, a QRS generator 22 which contains no QRS marker and which therefore can be part of a commercially available measuring device described above.

The QRS marker 28, which is necessary for error structure measurements and which, according to the present invention, is inserted at the receiving end 29, requires the QRS sample point which is to be marked and which is derived from the incoming transmission links 24 signal, i.e. from the transmitted test QRS from QRS generator 22. The sample point to be marked is supplied by the QRS symbol detector 26 and QRS starting pulse 27 blocks shown in FIG. 2.

Figure 3:
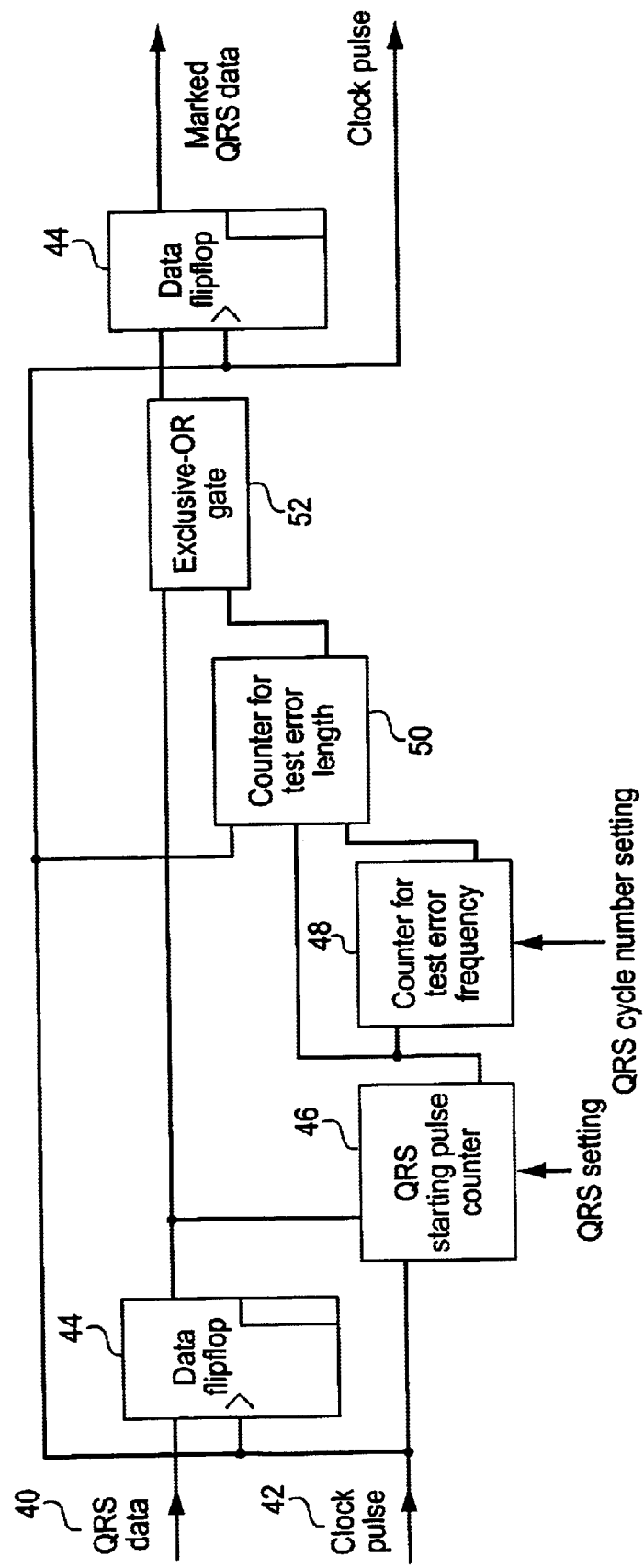
FIG. 3 shows a schematic block diagram of circuitry for a QRS marker.

A circuit arrangement for the three blocks depicted in FIG. 2—QRS symbol detector 26, QRS starting pulse 27 and QRS marker 28—is shown in FIG. 3, which is described in greater detail below.

Figure 4:
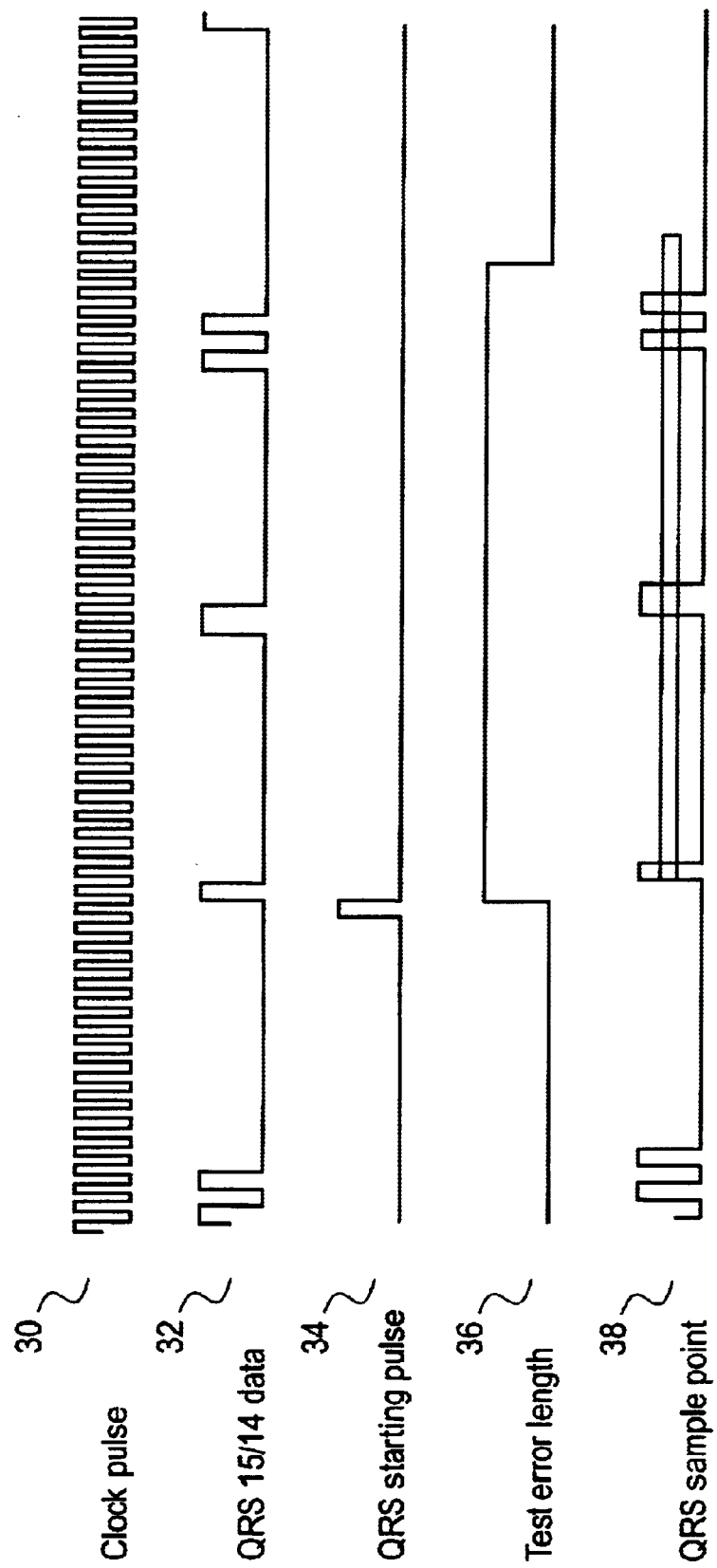
FIG. 4 shows a pulse diagram for a QRS marker.

The operating mode of the circuit is shown with reference to a five-line pulse diagram in FIG. 4.

In order to keep the circuit complexity within reasonable limits, it is advisable to restrict the subsequent receiving-end QRS marking to a few important QRS types.

QRS data are generated using feedback shift registers whose register length and feedback type determine the QRS resulting from them. The most frequently used QRSs are the QRS 23/18 and QRS 15/14 standardized by the ITU (International Telecommunication Union), both of which are transmitted as inverted data sequences and are available as adjustable test patterns in the data measuring devices of the leading measuring device manufacturers.

The first line (30) of FIG. 4 shows the pulse sequence of the data clock pulse. The second line (32) depicts the pulse sequence of the inverse QRS 15/14 on which the QRS marking to be carried out according to the present invention is shown.

The non-inverted QRS 15/14 is generated by a 15-stage shift register whose signals of the 15th and 14th stages, added in binary manner, are fed back at each clock pulse to the input of the 1st stage. This results in a QRS cycle of the length $(2^{15}-1)=32767$ bits, if the state of the standing shift register (all stages at low signal) is prevented by circuit engineering.

During the execution of the QRS cycle, controlled with clock timing, the shift register consecutively assumes all the different states which can be generated with 15 stages, of which one state can be decoded and determined as the starting point for QRS marking.

The third line (34) of FIG. 4 shows the generation of a starting pulse from the inverse data state "all shift register stage signals low". Namely, the high pulse of the starting pulse appears precisely where this easily decoded shift register state occurred in the QRS data signal of the second line (32). This shift register state occurs only once in the entire QRS cycle of 32767 bits. A starting pulse of 1 bit length is always generated at this QRS sample point.

A longer test error length pulse extending over several clock pulse periods is now developed from the QRS starting pulse, said test error length pulse being used for test error generation and thus for generating the QRS mark. The test error length pulse is shown in the fourth line (36) of FIG. 4. It should extend in its length over more clock-pulse periods than the shift register of the longest utilized QRS has stages, i.e., in the present case, it should include more than 23 bits. A pulse length of 36 bits was selected in the fourth line (36) of FIG. 4.

The fifth line (38) of FIG. 4 shows the QRS data of the second line (32) shifted by 1 bit, the sample point being marked which, after an adjustable number of QRS cycles, is inverted for the duration of the test error length pulse and which then yields in the receiver a test error length of 36 consecutive bit errors which are always located at a defined identical position in the QRS cycle. Because of their length, the bit errors cannot be confused with bit errors in the transmission link, because their maximum individual error length is always characterized by the number of shift register stages of the QRS reference signal generator.

In the circuit arrangement shown in FIG. 3, the received test signals coming from the data transmission link are designated with QRS data 40 and clock pulse (42) and are received by a first data flipflop.

In order, by circuit engineering means, to obtain the provided QRS symbol detection, QRS starting pulse generation and QRS marking, the QRS data 40 (here in the form of inverse QRS 15/14 data) and the data clock pulse 42 are supplied to a counter 46, and an identifier for the QRS type is added. This counter 46 is used to generate the QRS starting pulse and is controlled in such a manner that, in each case, as the QRS data pass through, it checks the individual lengths of the low states of the consecutively executed inverse QRS cycle in order to determine whether the low signal length of 15 bits, which occurs once in the cycle, has occurred and acknowledges this with a high signal at its decoding output.

Consequently, the simply constructed QRS starting pulse counter 46 already performs the functions of QRS symbol detection and QRS starting pulse generation shown in FIG. 1 and FIG. 2. However, overcounting of the bit number 15 must is to be prevented. The QRS starting pulse counter 46 should not generate the high signal (representing the starting pulse) whenever more than the provided 15 bits are determined as low signal length. This could occur in response to a fault in transmission in the form of an interruption in the transmission link.

Since the starting pulse is to be used for the subsequent QRS marking at the receiving end, a fault-induced misinterpretation of the receiver input signal, is to be prevented.

The protection against misinterpretation of the receiver input signal can also be further improved in that more bits than the 15 stages of the QRS shift register are included in the sample point detection. However, this then increases the circuit complexity for the decoding circuit. It should be borne in mind that a misinterpretation of the receiver input signal, which cannot be entirely ruled out, need not lead to incorrect measurement results, because the QRS marking according to the present invention is used for a subsequent bit error structure recording and any misinterpretation in the bit error structure records can be detected and can still be compensated for during the evaluation.

In FIG. 3, the QRS starting pulse, emitted once per cycle by the counter 46, is supplied to a second counter 48 which, with the aid of a QRS cycle number identifier, delivers a test error frequency signal which specifies after how many unmarked QRS cycles a QRS mark is again to be inserted.

This counter 48 for test error frequency is a simple asynchronous binary counter which is clocked with the QRS starting pulse and which, according to the cycle number identifier, emits an enabling signal after 16, 32, 64, 128, 256, . . . 32768 QRS cycles.

If, for example, the transmission rate of the transmission link is 2.048 Mbit/s and is measured with QRS 23/18, which has a cycle length of $(2^{23}-1)=8388607$ bits, the duration of a QRS cycle would be approximately 4 seconds. Measuring experience teaches, however, that QRS marking after approximately every 10 minutes would be sufficient.

A suitable number of QRS cycles for the unmarked cycles could be 128, which corresponds to an insertion pause of just under 9 minutes. In the case of QRS 15/14, which is repeated more frequently owing to its considerably shorter QRS cycle, there would be a required QRS cycle number of 32768 in order to obtain an insertion pause of identical length.

The pulse signals of the QRS starting pulse counter 46 and of the second counter 48 (test error enabling pulse) as well as the data clock pulse are supplied to a third counter 50 which generates the pulse for the test error length, corresponding to the fourth line (36) in FIG. 4.

The output signal of this counter 50 for the test error length is supplied to a first input of an exclusive-OR gate 52. The second input of the exclusive-OR gate 52 is connected to the output of the first data flipflop 44 which passes on the receiver input data (inverse QRS 15/14) with a 1 bit delay.

The output of the exclusive-OR gate 52 is connected to the input of a second data flipflop 54. This second data flipflop 54 blanks the logic signal of the exclusive-OR gate 52 with the data clock pulse and emits at its output the desired marked QRS data signal which is shown in the fifth line (38) in FIG. 4.

At the marked QRS sample point, the data signal is replaced by its inverted bit sequence, always according to the logic signal emitted in regular sequence by the exclusive-OR gate 52.

The QRS marked at the receiving end according to the present invention detects the same QRS sample point and have the same mark frequency as a known QRS marking at the transmitting end, so that the bit error structure recording and evaluation programs can be used in the accustomed manner.

What is claimed is:

1. A method for bit error structure measurements of a data transmission channel of a data transmission link, the method comprising:

transmitting a quasirandom sequence from a transmitting end over the transmission link to a receiving end, the quasirandom sequence serving as a measuring signal; and marking the transmitted quasirandom sequence at the receiving end upstream of a bit-for-bit comparator so as to form bit inversions at defined sample points, the marking being synchronized with the transmitted quasirandom sequence at the receiving end.

2. The method as recited in claim 1 wherein the marking is adapted to a transmitting-end marking.

3. The method as recited in claim 2 wherein the marking is adapted with respect to at least one of a defined sample point, a mark frequency and a number of clock pulse periods.

4. The method as recited in claim 3 wherein the marking is adapted with respect to a number of clock pulse periods, the number of clock periods exceeding a number of stages of the quasirandom sequence so as to differentiate line bit errors.

5. The method as recited in claim 1 wherein the marking is designed for quasirandom sequences conforming to an International Telecommunications Union standard.

6. The method as recited in claim 1 wherein the marking is performed using a module integrated in a data measuring device.

7. A system for bit error structure measurements of a data transmission channel of a data transmission link, the system comprising:

a transmitter for transmitting a quasirandom sequence from a transmitting end over the transmission link to a receiving end, the quasirandom sequence serving as a measuring signal; and a marker for marking the transmitted quasirandom sequence at the receiving end upstream of a bit-for-bit comparator so as to form bit inversions at defined sample points, the marking being synchronized with the transmitted quasirandom sequence at the receiving end.

8. The system as recited in claim 7 wherein the marking is adapted to a transmitting-end marking.

9. The system as recited in claim 8 wherein the marking is adapted with respect to at least one of a defined sample point, a mark frequency and a number of clock pulse periods.

10. The system as recited in claim 9 wherein the marking is adapted with respect to a number of clock pulse periods, the number of clock periods exceeding a number of stages of the quasirandom sequence so as to differentiate line bit errors.

11. The system as recited in claim 7 wherein the marking is designed for quasirandom sequences conforming to an International Telecommunications Union standard.

12. The system as recited in claim 7 wherein the marker includes a module integrated in a data measuring device.

13. A method for bit error structure measurements of a data transmission channel of a data transmission link, the method comprising:

transmitting a quasirandom sequence from a transmitting end over the transmission link to a receiving end, the quasirandom sequence serving as a measuring signal; and marking the transmitted quasirandom sequence at the receiving end upstream of a bit-for-bit comparator so as to form bit inversions at defined sample points, the marking being synchronized with the transmitted quasirandom sequence at the receiving end, wherein the marking is capable of being switched off when a transmitting-end marking is available.

14. A system for bit error structure measurements of a data transmission channel of a data transmission link, the system comprising:

a transmitter for transmitting a quasirandom sequence from a transmitting end over the transmission link to a receiving end, the quasirandom sequence serving as a measuring signal; and a marker for marking the transmitted quasirandom sequence at the receiving end upstream of a bit-for-bit comparator so as to form bit inversions at defined sample points, the marking being synchronized with the transmitted quasirandom sequence at the receiving end, wherein the marking is capable of being switched off when a transmitting-end marking is available.

* * * * *